Sept. 16, 1958 W. M. SHEEHAN 2,851,963
RAILWAY CAR FOR TRANSPORTING HIGHWAY TRAILERS
Filed April 5, 1954 3 Sheets-Sheet 1

INVENTOR.
William M. Sheehan
BY
Rodney Bedell
atty.

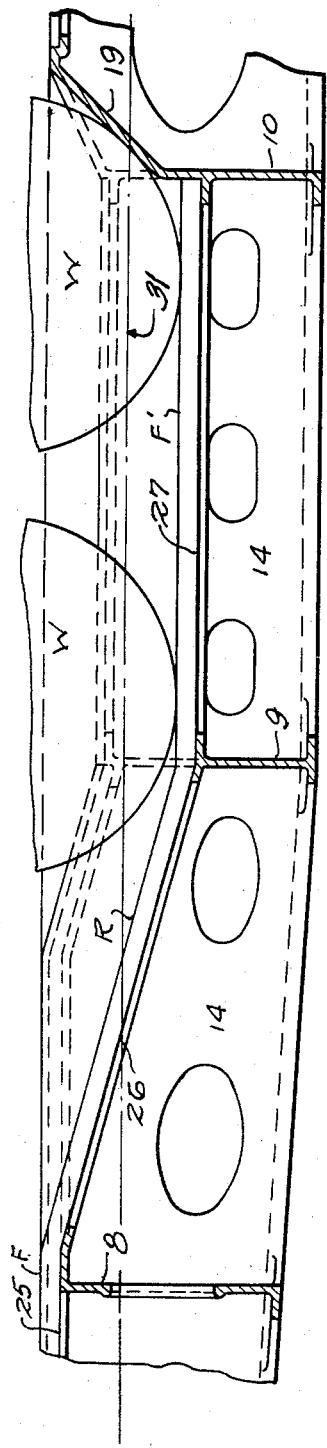# 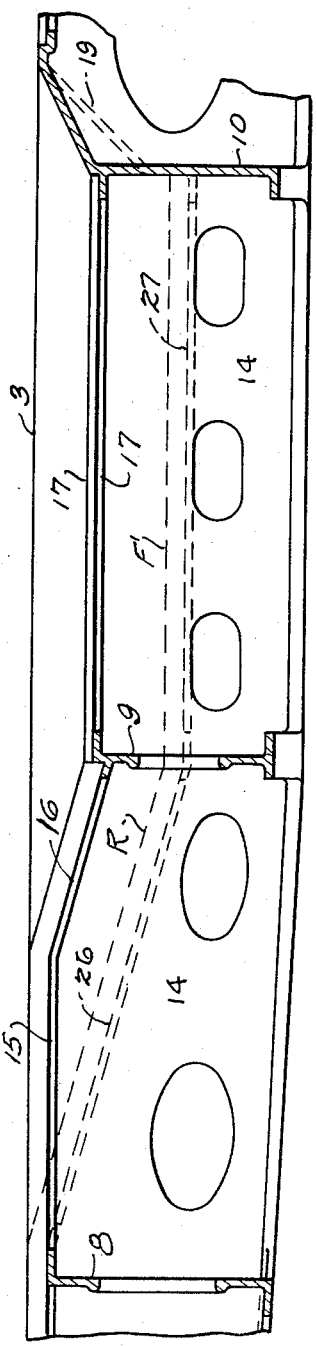 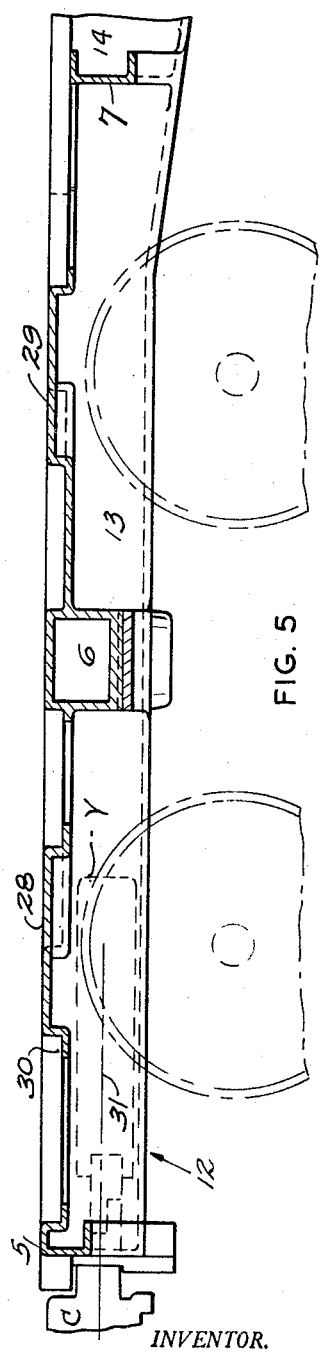

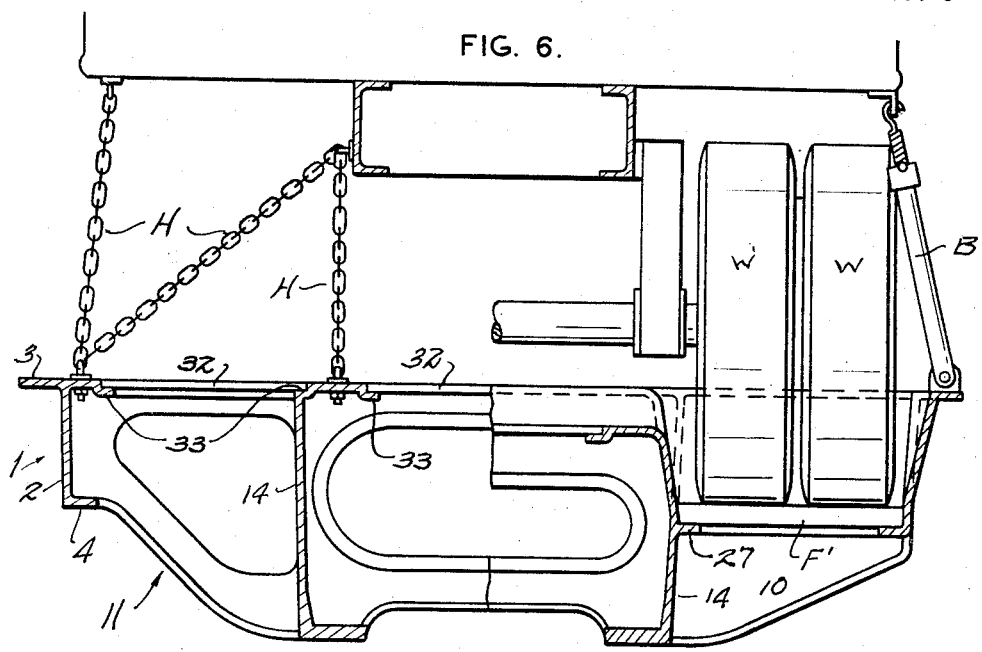

United States Patent Office 2,851,963
Patented Sept. 16, 1958

2,851,963
RAILWAY CAR FOR TRANSPORTING HIGHWAY TRAILERS

William M. Sheehan, Philadelphia, Pa., assignor to General Steel Castings Corporation, Granite City, Ill., a corporation of Delaware Application April 5, 1954, Serial No. 420,874

2 Claims. (Cl. 105—368)

The invention relates to railway rolling stock and consists in a novel car construction particularly adapted for the carrying of highway trailers, laden or unladen, which may be readily moved onto the car for delivery by rail to a distant point and moved off the car for transport by trucks or half-trucks over streets and highways.

In its simplest form, the combined transport of trailers on highways and on railway cars, now generally termed "piggy-back" service, involves running the trailers up a ramp onto a railway flat car and anchoring the trailer in place until the trailer is unloaded and moved by a truck or half-truck to the consignee. An alternate method of transferring trailers is to have the railway car track and the trailer roadway at different levels with the top of the car flush with the trailer roadway.

A number of problems have developed in connection with this general arrangement which makes the use of an ordinary flat car impracticable and among the more important are those arising from the need for adequate lengths and capacity, the transmission of draft and buffing forces, the provision of adequate clearance between high trailers and overhead structures along railway track, the efficient mounting of more than one trailer upon a single car, and the safe mounting of the trailer to avoid undesirable movement of the same on the car, the avoidance of undue weight and other dimensions in the railway car, and the adaptation of the railway car for uses other than the carrying of highway trailers.

The objects of the invention are to provide answers to these problems in a practical structure and these objects are attained by providing a substantially one piece cast car frame characterized by the special features described below.

In the accompanying drawings illustrating selected embodiments of the invention, Figure 1 is a side elevation of one-half of a railway car of the type described and showing a highway trailer mounted thereon.

Figure 3 is a detail longitudinal vertical section drawn to an enlarged scale and taken on the line 3—3 of Figure 2.

Figure 4 is a similar section taken on the line 4—4 of Figure 2.

Figure 5 is a similar section taken on the line 5—5 of Figure 2.

Figure 6 is a detail vertical transverse section taken on the line 6—6 of Figure 2.

Figure 7 is a similar section taken on the line 7—7 of Figure 2.

Figure 8 is a similar section taken on the line 8—8 of Figure 2.

Figure 1:
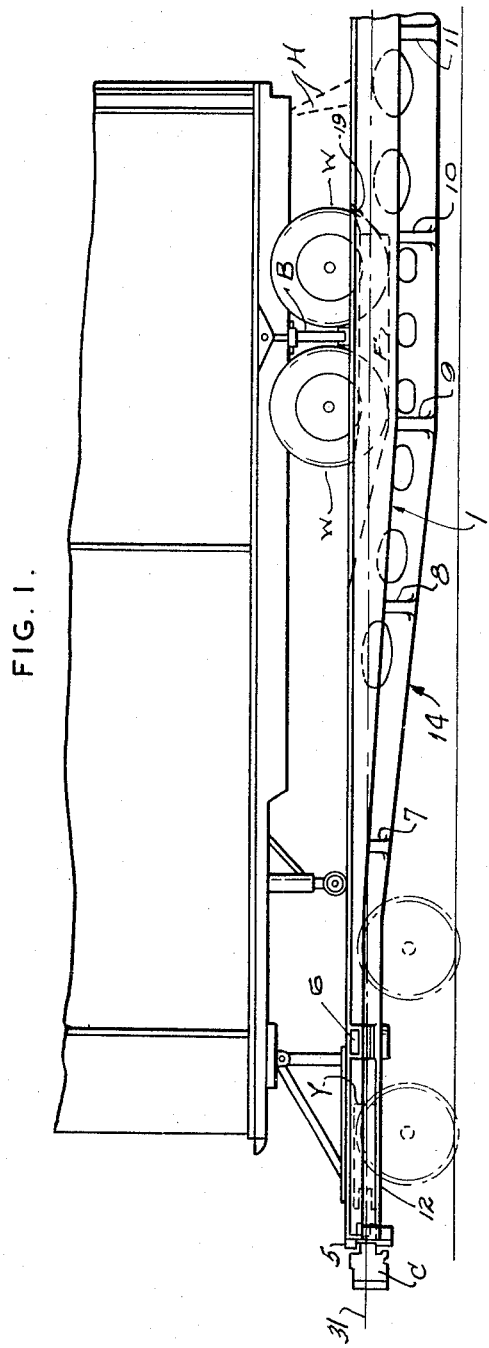
Figure 2:
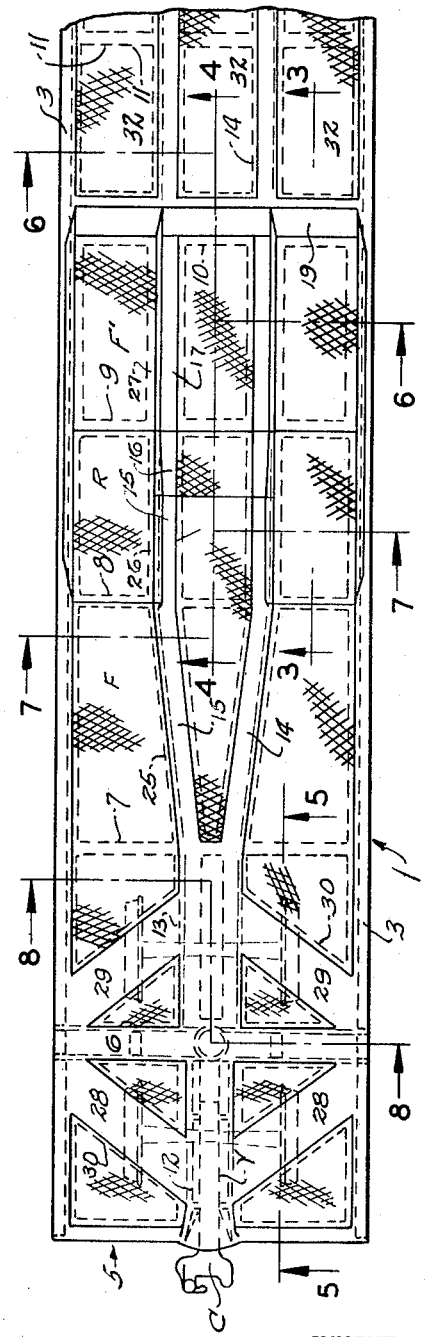
Figure 2 is a top view of the railway car shown in Figure 1.

The car frame includes side sills 1 of Z-shaped cross section extending from end to end of the frame, each having a vertical web 2 which increases in depth towards the center of the car to form a fish-belly girder. The sill top flange 3 and bottom flange 4 each extend from end to end of the frame without substantial change in width or thickness.

Extending from side sill to side sill are end sills 5, bolsters 6, and intermediate transoms 7, 8, 9, 10, and 11, the latter being midway between the ends of the car.

The main load-carrying and longitudinal force transmitting part of the car frame is positioned intermediate the side sills and includes a box section draft sill 12, extending from each end sill to the adjacent bolster, a somewhat wider box section center sill 13, extending from each bolster to the adjacent transom 7, and channellike center sills 14, diverging from each other from transom 7 towards the next transom 8 from which they extend parallel to each other to the center of the car. The inner end of center sill 13 and the portions of center sills 14 between transoms 7 and 8 deepen in vertical section towards transoms 8. Between transoms 8 and transoms 9, the top flange 15 of each center sill 14 inclines downwardly at 16 (Figure 4) and extends towards transom 10 at a lower level 17 than the upper flange of side sills 1 and the remainder of the draft and center sills.

Substantially throughout their length, center sill members 12, 13, and 14 are provided with floor-supporting shoulders 25 (Figures 3, 7). Between transoms 8 and the ends of the car, these shoulders are immediately below the top level of the sills so that the flooring F supported on the shoulders is flush with the top faces of the sills, bolsters and end sills. Inwardly of transoms 8, shoulders 25 incline downwardly, as indicated at 26, towards transoms 9 and then extend horizontally, as indicated at 27, towards transoms 10 and abreast of the lower level portions 17 of the sill top flanges, thus providing a floor section F' at a substantially lower level than floor sections F and connected thereto by inclined or ramp sections R.

At each end of the car, diagonal webs 28 and 29 diverge from each end of the bolster 6 towards the ends of the draft sill 12 and box section center sill 13, remote from the bolster. Floor supporting shoulders 30 cooperate with sill shoulders 25 to mount flooring which may consist of planking or metal grating or metal plate.

When a trailer is loaded onto the car, it may be moved lengthwise, transversely, or diagonally over the elevated end floor portions, sills and diagonals, which extend from side to side of the car, and then down the ramp sections onto the lower floor sections, as indicated in Figure 1, so that the trailer main wheels W are positioned at a substantially lower level than the top of the car frame. The adjacent drop portions of the center sills provide adequate clearance for the trailer truck main wheel axle and for brake gear and cross framing adjacent to the axle, which otherwise would strand upon the sills and prevent travel of the trailer wheels to the lower floor portions F'.

Transoms 10 project upwardly from lower floor sections F' and form chocks 19 for the trailer wheels.

With this arrangement, a trailer of maximum height may be loaded upon the car from either end by half trucks or otherwise and transported to destination without projecting beyond standard clearance limits. Buffing and draft forces are transmitted to the underframe through usual couplers C and draft gear indicated by the yoke Y mounted in draft sill 12. The center line of draft indicated at 31 is at the standard height which varies from 31½" for loaded car to 34½" for light car and extends intermediate the top and bottom of the draft sills and bolster and the box section center sill and intermediate levels of the upper and lower floor sections F and F'. Accordingly, the trailer main wheels are supported below the center line of draft which affords a low center of gravity and a low height of trailer roof as compared with ordinary flat cars loaded with trailers.

The portions of the car floor between center sill portions 15 and between transoms 9, 10, and 11 are not susceptible of a concentrated application of load through the trailer wheels, because the wheels of the trailer do not run on this part of the car at any time, and this part of the car frame may have lighter floor members, as indicated at 32 in Figure 6, the adjacent portions of the sills being provided with shoulders 33 offset a less distance from the top face of the sills than the shoulders 25 and 30 previously described.

Figures 6 and 7 indicate the upwardly diverging relation between the side sill webs and the center sill webs, whereby the casting of the car frame is facilitated and the trailer wheels are more readily guided onto the lower floor sections.

It will be understood that when the trailers are loaded on the car, they will be anchored in position by suitable hold-down or bracing structure, as indicated at H and B, and disclosed more clearly in Patent No. 2,118,364, issued to the present applicant May 24, 1938. These details form no part of the present invention.

Variations in the details of the sill and floor structures may be made without departing from the principles of the invention and the exclusive use of those modifications of the structure coming within the scope of the claims is contemplated.

What is claimed is:

1. A railway car having center sill structure and side sill structure extending inwardly from the end of the car, the upper portions of said structures being at substantially the same level and being provided with downwardly offset shoulders, end floor sections supported on said shoulders with their top faces substantially flush with the tops of said structures, inclined floor sections spaced apart transversely of the car and extending downwardly from the inner ends of said first-mentioned floor sections toward the middle of the car, and low-level floor sections extending from each side sill to the center sill structure and from the ends of said inclined floor sections towards the middle of the car, there being an upright transverse framing transom at the transverse middle of the car extending substantially the full depth of the sill structures and from side to side of the car and forming the inner end of wells between the sill structures for limiting the movement of highway trailers along the low-level floor sections.

2. A railway car having center sill structure and side sill structure extending from end to end of the car, the upper portions of said sill structures being at substantially the same level throughout their length, a cross transom extending from side to side of the car intermediate the ends of the car and merging with said sill structures and corresponding in depth to said sill structures where merging therewith, end floor sections extending from side to side of the car with their top faces substantially flush with the tops of said sill structures, inclined floor sections at opposite sides of said center sill structure and spaced apart transversely of the car and extending inwardly from the inner ends of said first mentioned floor sections and toward the middle of the car, and low level middle floor sections extending from each side sill structure to the center sill structure and from the ends of said inclined floor sections toward said cross transom and merging with the latter, said inclined floor sections and middle floor sections and cross transom forming wells between the side sill structures and the center sill structure for receiving the wheels of highway trailers mounted upon the car.

References Cited in the file of this patent

UNITED STATES PATENTS

| | | |
|---|---|---|
| 1,734,303 | Ross | Nov. 5, 1929 |
| 2,118,364 | Sheehan | May 24, 1938 |
| 2,121,181 | Bayerl | June 21, 1938 |
| 2,246,543 | Smith | June 24, 1941 |
| 2,305,444 | Pond | Dec. 15, 1942 |
| 2,561,653 | Eksergian | July 24, 1951 |
| 2,585,126 | Holland | Feb. 12, 1952 |

FOREIGN PATENTS

| | | |
|---|---|---|
| 387,810 | Germany | Jan. 7, 1924 |

OTHER REFERENCES

"Modern Railroads," October 1953, pp. 46–47. (Copy in Scientific Library, photostat copy in Div. 34.)